(12) United States Patent
Patel (10) Patent No.: US 9,067,169 B2
(45) Date of Patent: Jun. 30, 2015

(54) METHODS OF PREPARING AN IMPURITY-DEPLETED HYDROGEN STREAM, METHODS OF ANALYZING CONTENT OF AN IMPURITY-DEPLETED HYDROGEN STREAM, AND PRESSURE SWING ADSORPTION APPARATUSES

(71) Applicant: UOP LLC, Des Plaines, IL (US)

(72) Inventor: Kirit M. Patel, Winfield, IL (US)

(73) Assignee: UOP LLC, Des Plaines, IL (US)

( * ) Notice: Subject to any disclaimer, the term of this patent is extended or adjusted under 35 U.S.C. 154(b) by 156 days.

(21) Appl. No.: 13/903,850

(22) Filed: May 28, 2013

(65) Prior Publication Data

US 2014/0352531 A1     Dec. 4, 2014

(51) Int. Cl.
*B01D 53/047* (2006.01)

(52) U.S. Cl.
CPC .... *B01D 53/047* (2013.01); *B01D 2259/40028* (2013.01); *B01D 2257/502* (2013.01); *B01D 2256/16* (2013.01); *B01D 2259/40009* (2013.01); *B01D 2259/40043* (2013.01); *B01D 2257/7025* (2013.01)

(58) Field of Classification Search
CPC .. B01D 53/04; B01D 53/047; B01D 2256/16; B01D 2257/502; B01D 2257/7025; B01D 2259/40009; B01D 2259/40043; B01D 2259/40028
USPC .......................... 95/8, 11, 140, 143; 423/247
See application file for complete search history.

(56) References Cited

U.S. PATENT DOCUMENTS

| | | | |
|---|---|---|---|
| 4,553,981 A | | 11/1985 | Fuderer |
| 4,693,730 A | * | 9/1987 | Miller et al. .......................... 95/8 |
| 5,171,333 A | | 12/1992 | Maurer |
| 5,258,059 A | * | 11/1993 | Yamaguchi et al. ............ 95/100 |
| 5,767,388 A | | 6/1998 | Fleischer et al. |
| 6,942,719 B2 | * | 9/2005 | Stewart ........................... 95/106 |
| 8,328,913 B2 | * | 12/2012 | Shito et al. ...................... 96/108 |

(Continued)

FOREIGN PATENT DOCUMENTS

WO    2009088971 A1    7/2009
WO    WO 2012/145058 A1 * 10/2012

OTHER PUBLICATIONS

Search Report dated Oct. 7, 2014 for corresponding PCT Appl. No. PCT/US2014/038304.
Lopes, et al., "Fast-Cycling VPSA for Hydrogen Purification," Fuel, vol. 93, Mar. 2012, pp. 510-523.

(Continued)

*Primary Examiner* — Frank Lawrence (57) ABSTRACT

Methods of preparing an impurity-depleted hydrogen stream, methods of analyzing content of an impurity-depleted hydrogen stream from a pressure swing adsorption process, and pressure swing adsorption apparatuses are provided herein. In an embodiment, a method of analyzing content of an impurity-depleted hydrogen stream from a pressure swing adsorption process includes providing a hydrogen-containing feed stream to a pressure swing adsorption zone. The hydrogen-containing feed stream further includes an impurity content including methane and carbon monoxide. Methane and carbon monoxide are adsorbed from the hydrogen-containing feed stream in the pressure swing adsorption zone. The impurity-depleted hydrogen stream is withdrawn from the pressure swing adsorption zone, with the impurity-depleted hydrogen stream having a residual methane content and a residual carbon monoxide content. The residual methane content of the impurity-depleted hydrogen stream is sensed.

7 Claims, 3 Drawing Sheets

(56) References Cited

U.S. PATENT DOCUMENTS

| | | | |
|---|---|---|---|
| 2008/0078294 A1 | 4/2008 | Adamopoulos | |
| 2010/0047160 A1 | 2/2010 | Allam | |
| 2011/0005391 A1 | 1/2011 | Cho et al. | |
| 2012/0234165 A1* | 9/2012 | Elseviers et al. | 95/11 |
| 2012/0275992 A1 | 11/2012 | Jangbarwala | |
| 2012/0304688 A1 | 12/2012 | Dragomir et al. | |
| 2014/0053724 A1* | 2/2014 | Raatscher et al. | 95/11 |

OTHER PUBLICATIONS

Ahn, et al., "Layered Two- and Four-Bed PSA Processes for H2 Recovery From Coal Gas," Chemical Engineering Science, vol. 68, Issue 1, Jan. 22, 2012, pp. 413-423.

Bonnot, et al., "Effects of Composition, Temperature and Purge on the Performance of the Cyclic Adsorption of CO2 and CH4 on Activated Carbon," Chemical Engineering Research and Design, vol. 84, Issue 3 A, Mar. 2006, pp. 192-208.

* cited by examiner

METHODS OF PREPARING AN IMPURITY-DEPLETED HYDROGEN STREAM, METHODS OF ANALYZING CONTENT OF AN IMPURITY-DEPLETED HYDROGEN STREAM, AND PRESSURE SWING ADSORPTION APPARATUSES

TECHNICAL FIELD

The technical field generally relates to methods of preparing an impurity-depleted hydrogen stream, methods of analyzing content of impurity-depleted hydrogen streams, and pressure swing adsorption apparatuses. More particularly, the technical field relates to methods and pressure swing adsorption apparatuses that enable analysis of the impurity content of impurity-depleted hydrogen streams after adsorption of impurities from hydrogen-containing feeds that are provided to pressure swing adsorption apparatuses.

BACKGROUND

Pressure swing adsorption (PSA) processes provide an efficient and economical process for separating a multicomponent gas stream that contains at least two gases that have different adsorption characteristics. One of the gases may be preferentially adsorbed and can be an impurity that is separated from the other gas, which may be taken off as product. Alternatively, the gas that is preferentially adsorbed can be the desired product, which is separated from the other gas. For example, it may be desired to remove carbon monoxide and light hydrocarbons from a hydrogen-containing feed stream to produce an impurity-depleted hydrogen (99+% $H_2$) stream for a hydrocracking or hydrotreating process where the impurities, especially carbon monoxide, could adversely affect the catalyst or the reaction.

In pressure swing adsorption processes, the multicomponent gas stream is typically fed to one or more adsorption beds at an elevated pressure to effectuate adsorption of at least one component, while at least one other component passes through the adsorption bed. At a defined time, feed to the adsorption bed is terminated and the adsorption bed is depressurized in one or more cocurrent depressurization steps wherein pressure is reduced to a defined level that permits the separated, less-strongly adsorbed component or components to be withdrawn from the adsorption bed without significant desorption of the preferentially adsorbed components. Then, the adsorption bed is depressurized in a countercurrent depressurization step wherein the pressure in the adsorption bed is further reduced by withdrawing desorbed gas countercurrently to the direction in which of the multicomponent gas stream is fed. In multi-bed adsorption units, there are typically additional steps, and those noted above may be done in stages.

It is particularly desirable to minimize the amount of carbon monoxide in the impurity-depleted hydrogen streams, with residual carbon monoxide content in the impurity-depleted hydrogen streams after adsorption targeted for less than about 10 parts per million by volume. A conventional technique for controlling residual carbon monoxide content in the impurity-depleted hydrogen stream is to adjust the duration of the adsorption step for each adsorption bed. If the residual carbon monoxide content of the impurity-depleted hydrogen stream is too high, the adsorption step is shortened. Conversely, if the residual carbon monoxide content too conservative, the adsorption step may be lengthened to increase hydrogen recovery rates. However, control of residual carbon monoxide content in impurity-depleted hydrogen streams that are produced in accordance with existing control systems for pressure swing adsorption processes is difficult because residual carbon monoxide content in the impurity-depleted hydrogen streams is slow to react to changes in cycle time for the adsorption step, and because once residual carbon monoxide content in the impurity-depleted hydrogen streams begins to increase, the increase in residual carbon monoxide content is generally sharp. As a result, existing control systems that sense the residual carbon monoxide content in the impurity-depleted hydrogen stream are ineffective to adequately lengthen the adsorption step without exceeding desired residual carbon monoxide content limits in the impurity-depleted hydrogen stream. Thus, existing pressure swing adsorption processes are generally operated conservatively with residual carbon monoxide content in the impurity-depleted hydrogen stream significantly below permissible threshold values for residual carbon monoxide content. Such conservative operation of the existing pressure swing adsorption processes reduces yield of recovered hydrogen and is inefficient.

Accordingly, it is desirable to provide methods of preparing an impurity-depleted hydrogen stream, methods of analyzing content of an impurity-depleted hydrogen stream, and pressure swing adsorption apparatuses than enable maximized control of residual carbon monoxide content in the impurity-depleted hydrogen stream, thereby enabling maximized hydrogen recovery without risk of exceeding permissible threshold values for residual carbon monoxide content in the impurity-depleted hydrogen stream. Furthermore, other desirable features and characteristics of the present invention will become apparent from the subsequent detailed description of the invention and the appended claims, taken in conjunction with the accompanying drawings and this background of the invention.

BRIEF SUMMARY

Methods of preparing an impurity-depleted hydrogen stream, methods of analyzing content of an impurity-depleted hydrogen stream from a pressure swing adsorption process, and pressure swing adsorption apparatuses are provided herein. In an embodiment, a method of analyzing content of an impurity-depleted hydrogen stream from a pressure swing adsorption process includes providing a hydrogen-containing feed stream to a pressure swing adsorption zone. The hydrogen-containing feed stream further includes an impurity content including methane and carbon monoxide. Methane and carbon monoxide are adsorbed from the hydrogen-containing feed stream in the pressure swing adsorption zone. The impurity-depleted hydrogen stream is withdrawn from the pressure swing adsorption zone, with the impurity-depleted hydrogen stream having a residual methane content and a residual carbon monoxide content. The residual methane content of the impurity-depleted hydrogen stream is sensed.

In another embodiment, a method of preparing an impurity-depleted hydrogen stream includes generating a hydrogen-containing feed stream that includes an impurity content including methane and carbon monoxide. The hydrogen-containing feed stream is provided to a pressure swing adsorption zone that includes a multi-bed adsorption unit. The multi-bed adsorption unit includes a first adsorption bed and a second adsorption bed. Methane and carbon monoxide are adsorbed from the hydrogen-containing feed stream in the first adsorption bed to produce the impurity-depleted hydrogen stream. The impurity-depleted hydrogen stream has a residual methane content and a residual carbon monoxide content. A portion of the impurity-depleted hydrogen stream is withdrawn from the first adsorption bed as a purge stream to the second adsorption bed for regenerating the second adsorption bed. A portion of the impurity-depleted hydrogen stream is withdrawn from the first adsorption bed as a product stream. The residual methane content of the purge stream is sensed, and the residual carbon monoxide content of the product stream is sensed. A measurement of the sensed residual methane content and a measurement of the sensed residual carbon monoxide content are communicated to a control unit.

In another embodiment, a pressure swing adsorption apparatus includes an adsorption unit that is adapted to receive a hydrogen-containing feed stream that has an impurity content. The adsorption unit is further adapted to produce an impurity-depleted hydrogen stream. An effluent line is in fluid communication with the adsorption unit for receiving the impurity-depleted hydrogen stream therefrom. A methane sensor is in fluid communication with the effluent line, with the methane sensor adapted to sense a residual methane content of the impurity-depleted hydrogen stream.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Methods of preparing an impurity-depleted hydrogen stream, methods of analyzing content of impurity-depleted hydrogen streams from a pressure swing adsorption (PSA) process, and PSA apparatuses are provided herein. In particular, in accordance with the methods described herein, a hydrogen-containing feed stream that also includes an impurity content including methane and carbon monoxide is provided to a PSA zone, where the methane and carbon monoxide are adsorbed. An impurity-depleted hydrogen stream is withdrawn from the PSA zone. The impurity-depleted hydrogen stream may be provided as a product stream, although portions thereof may be withdrawn for use in intermediate unit operations. Residual methane content of the impurity-depleted hydrogen stream is sensed and can be employed to determine effectiveness of adsorption of not only the methane from the hydrogen-containing feed stream, but also the effectiveness of carbon monoxide adsorption. In particular, breakthrough of methane through the PSA zone can be readily correlated to breakthrough of carbon monoxide. Thus, sensing of residual methane content can provide an indication of eventual carbon monoxide breakthrough. Although methane is not or is less toxic to catalysts and reactions than carbon monoxide, breakthrough of carbon monoxide through the PSA zone takes significantly longer to reach steady state than methane. As such, sensing the residual methane content of the impurity-depleted hydrogen stream provides quicker feedback of impurity breakthrough in the impurity-depleted hydrogen stream after adsorption and, therefore, enables maximized control of residual impurity content, including residual carbon monoxide content, in the impurity-depleted hydrogen stream as compared to control schemes that rely upon sensing of carbon monoxide alone. By providing quicker feedback of impurity breakthrough, maximized hydrogen recovery is possible without risk of exceeding permissible threshold values for residual carbon monoxide content in the impurity-depleted hydrogen stream.

Figure 1:
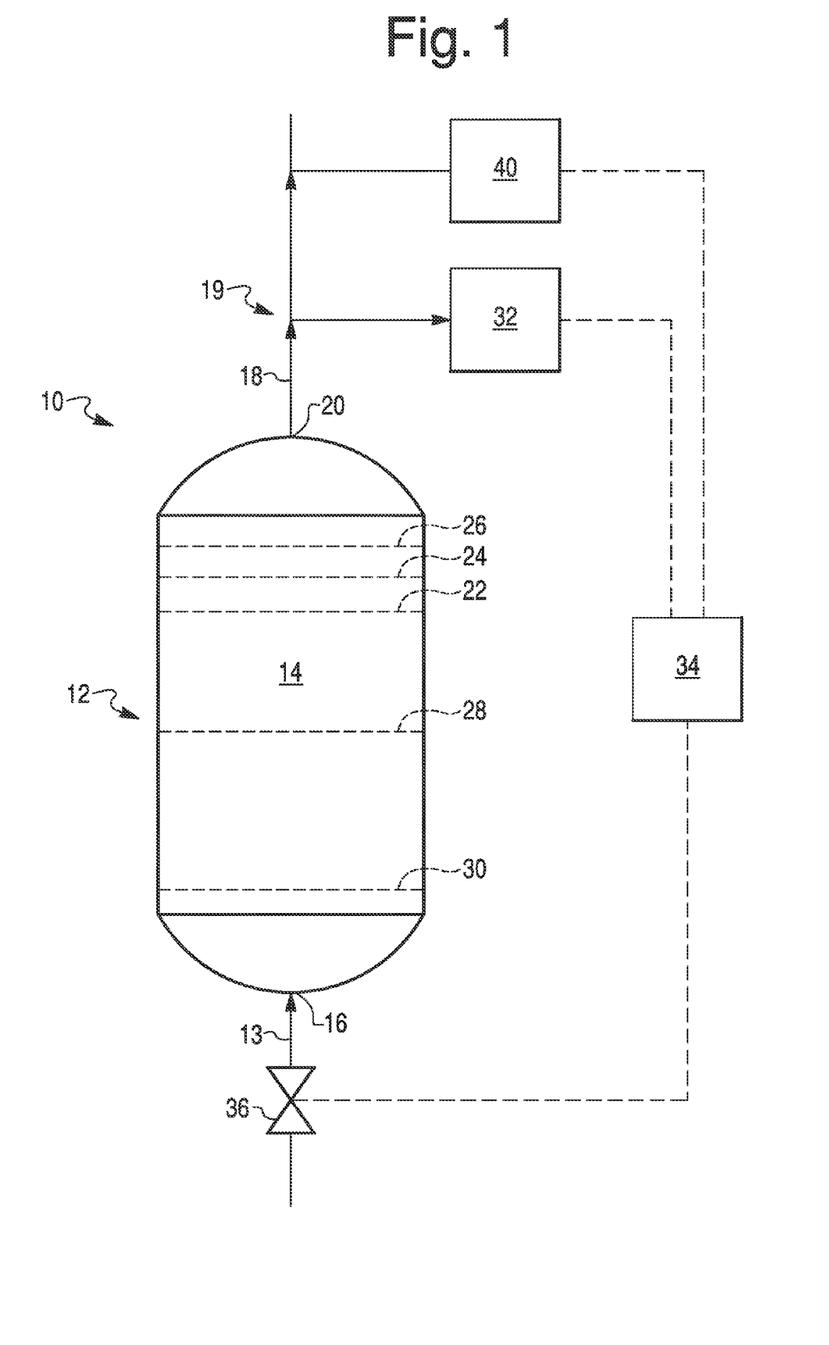
FIG. 1 is a schematic view of a pressure swing adsorption apparatus including an adsorption unit in accordance with an embodiment.

An embodiment of a method of preparing an impurity-depleted hydrogen stream 18 will now be described using an exemplary PSA apparatus 10 as shown in FIG. 1. Referring to FIG. 1, the PSA apparatus 10 includes an adsorption unit 12 that is adapted to receive a hydrogen-containing feed stream 13, and is further adapted to produce an impurity-depleted hydrogen stream 18 through a PSA process, as described in further detail below. In accordance with an embodiment, the hydrogen-containing feed stream 13 is provided to a PSA zone, such as the PSA apparatus 10. The hydrogen-containing feed stream 13 includes an impurity content including methane and carbon monoxide, with other optional impurities also present such as, but not limited to, carbon dioxide, nitrogen, and water. The term "impurity" denotes a component or components in the hydrogen-containing feed stream 13 that are more-strongly adsorbed in the PSA apparatus 10 than hydrogen. Thus, the material described as the "impurity" is not limited to a common definition of the term which denotes something unwanted and to be discarded. In an embodiment, the hydrogen-containing feed stream 13 may be generated in accordance with the method, although it is to be appreciated that in other embodiments, the hydrogen-containing feed stream 13 may be provided from any source. The hydrogen-containing feed stream 13 may be generated from various industrial operations such as, for example, steam reforming Referring to FIG. 1, the adsorption unit 12 includes an adsorption bed 14 that includes adsorbent material that is capable of preferentially adsorbing the impurities, particularly methane and carbon monoxide, over hydrogen from the hydrogen-containing feed stream 13. Suitable adsorbent material includes, but is not limited to, zeolitic molecular sieves, activated carbon, silica gel, activated alumina, and the like, provided that the adsorbent material preferentially adsorbs carbon monoxide and methane over hydrogen. An exemplary adsorption bed 14 that is suitable for the adsorption unit 12 has a lower layer of activated carbon and an upper layer of zeolitic molecular sieve.

Conventional techniques may be employed to conduct the PSA process in the adsorption unit 12 that has the single adsorption bed 14. Conventional PSA processes are generally adiabatic processes for separating a multicomponent stream that contains at least one preferentially-adsorbable component from other non-preferentially adsorbable components in the multicomponent stream. In accordance with an embodiment, methane and carbon monoxide are adsorbed from the hydrogen-containing feed stream 13 in the PSA zone, in particular, in the adsorption unit 12. The adsorption bed 14, because of packing of the adsorbent material, contains voids within which the hydrogen accumulates, thereby separating the hydrogen from the methane and carbon monoxide that are adsorbed by the adsorbent material. In particular, the hydrogen-containing feed stream 13 is introduced into the adsorption unit 12 and contacted with the adsorption bed 14 at an inlet end 16 of the adsorption bed 14 at a first elevated pressure, thereby effectuating adsorption of the methane and carbon monoxide by the adsorbent material and trapping hydrogen in the voids.

As feed to the adsorption bed 14 progresses over time, an impurity adsorption front is established at the inlet end 16 of the adsorption bed 14 and progressively moves longitudinally through the adsorption bed 14 toward an outlet end 20 of the adsorption bed 14 to a predetermined level 22 within the adsorption bed 14. The introduction of the hydrogen-containing feed stream 13 is terminated upon the impurity adsorption front reaching the predetermined level 22.

An impurity-depleted hydrogen stream 18, including hydrogen, is withdrawn from the adsorption unit 12, such as through an outlet end 20 of the adsorption bed 14. In particular, in an embodiment and as shown in FIG. 1, the PSA apparatus 10 includes an effluent line 19 that is in fluid communication with the adsorption unit 12 for receiving the impurity-depleted hydrogen stream 18 from the outlet end 20 of the adsorption bed 14. The effluent line 19, as referred to herein, encompasses any line through which the impurity-depleted hydrogen stream 18 flows upon discharge from the adsorption unit 12, and may be a single line for conveying the impurity-depleted hydrogen stream 18 during all stages of the PSA process. Alternatively, as described in further detail below, the effluent line may be split to include a separate product line 241 and purge line 243.

The impurity-depleted hydrogen stream 18, as referred to herein, is a stream that is discharged from the adsorption unit 12, through the effluent line 19, and that has a lower impurity content than the hydrogen-containing feed stream 13 with at least some of the impurities having been separated from the hydrogen-containing feed stream 13 through adsorption. In an embodiment, the impurity-depleted hydrogen stream 18 has a residual methane content and a residual carbon monoxide content, i.e., the impurity-depleted hydrogen stream 18 need not be completely free of residual methane and residual carbon monoxide, thereby enabling maximized hydrogen recovery provided that the residual carbon monoxide content remains below a permissible threshold value as described below.

Figure 2:
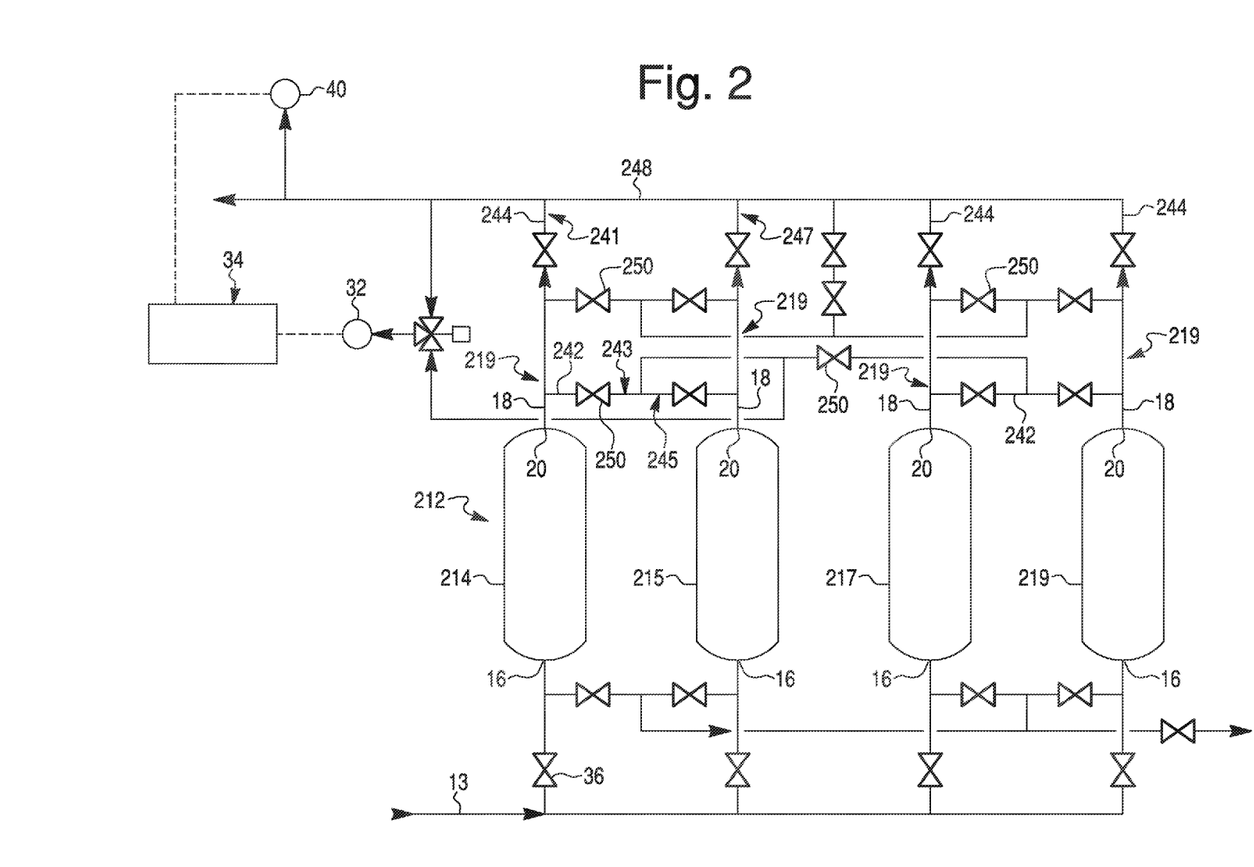
FIG. 2 is a schematic view of a pressure swing adsorption apparatus including a multi-bed adsorption unit in accordance with another embodiment.

In an embodiment, the flow of the hydrogen-containing feed stream 13 to the adsorption unit 12 is terminated and the adsorption bed 14 is cocurrently depressurized. For example, flow of the hydrogen-containing feed stream 13 may be terminated prior to cocurrent depressurization of the adsorption bed 14, with depressurization conducted after terminating flow of the hydrogen-containing feed stream 13 by withdrawing the impurity-depleted hydrogen stream 18 through the outlet end 20 and into the effluent line 19. The adsorption bed 14 may be cocurrently depressurized from the first elevated pressure to a lower but still elevated pressure relative to atmospheric pressure, which causes the impurity adsorption front at the predetermined level 22 to advance toward the outlet end 20 of the adsorption bed 14 to a new level 26. One or more intermediate steps of pressure equalization may be conducted during cocurrent depressurization to bring the front to level 24, with a final stage of cocurrent depressurization advancing the front to level 26. Referring momentarily to FIG. 2, in multi-bed adsorption units 212 and as described in further detail below, the impurity-depleted hydrogen stream 18 produced during cocurrent depressurizing of one adsorbent bed 214 may be provided as a purge stream 242 to another adsorption bed 215 for regenerating the other adsorption bed 215. Thus, this step can be termed a provide purge step.

Following cocurrent depressurization and referring to FIG. 1, the adsorption bed 14 is generally desorbed countercurrently to the direction of feed by further decreasing the pressure in the adsorbent bed 14 and withdrawing desorbed gas at the inlet end 16 of the adsorption bed 14. This step brings the front to level 28. Finally, the adsorbent bed 14 may be cocurrently depressurized with another impurity-depleted hydrogen stream 18 from another adsorption bed 14, or purged with pure hydrogen, to bring the front to level 30.

In accordance with the exemplary method, the residual methane content of the impurity-depleted hydrogen stream 18 is sensed. In an embodiment and as shown in FIG. 1, the PSA apparatus 10 includes a methane sensor 32 that is in fluid communication with the effluent line 19, with the methane sensor 32 adapted to sense a residual methane content of the impurity-depleted hydrogen stream 18. In this regard, the methane sensor 32 may be in fluid communication with the impurity-depleted hydrogen stream 18 to facilitate sensing of the residual methane content thereof. In an embodiment, the methane sensor 32 is a gas analyzer such as an infrared analyzer, which can measure the concentration of methane in the impurity-depleted hydrogen stream 18. In the PSA apparatus 10 of FIG. 1, a single methane sensor 32 can be used to sense the residual methane content of the impurity-depleted hydrogen stream 18 during all stages of the PSA process, i.e., during both cocurrent depressurization and during steady state operation where the impurity-depleted hydrogen stream 18 is a product of the PSA apparatus 10. However, it is to be appreciated that in other embodiments and although not shown, separate methane sensors may be employed to sense residual methane content during different stages of the PSA process.

The residual methane content of the impurity-depleted hydrogen stream 18 may be sensed for any purpose, including for providing process data alone or for providing a measurement of residual methane content for use in control of the PSA process. Further, the residual methane content of the impurity-depleted hydrogen stream 18 may be sensed at any point during the PSA process, as the impurity-depleted hydrogen stream 18 is flowing through the effluent line 19. Further still, the residual methane content of the impurity-depleted hydrogen stream 18 may be continuously sensed to provide continuous measurements of the residual methane content in the impurity-depleted hydrogen stream 18. In an embodiment, the residual methane content of the impurity-depleted hydrogen stream 18 is sensed at least during cocurrent depressurizing, which is generally the earliest point in the PSA process where methane breakthrough will arise after cycling of the PSA process. "Breakthrough", as used herein, refers to passage of a subject impurity through the adsorption unit 12 that is designed to adsorb the subject impurity, with breakthrough occurring due to process variables such as, but not limited to, adsorbent bed saturation, hydrogen-containing feed stream 13 flow rates, and/or high impurity content of the hydrogen-containing feed stream 13. By sensing residual methane content in the impurity-depleted hydrogen stream 18 during cocurrent depressurization, especially near the end of cocurrent depressurization, measurements of the residual methane content in the impurity-depleted hydrogen stream 18 may be communicated to a control unit 34 to adjust the PSA process and ensure that threshold levels of impurities are not exceeded in the impurity-depleted hydrogen stream 18, as described in further detail below.

In an embodiment, the residual carbon monoxide content of the impurity-depleted hydrogen stream 18 is also sensed, although it is to be appreciated that residual methane content alone may be sensed in accordance with embodiments of the method. In this embodiment, the PSA apparatus 10 further includes a carbon monoxide sensor 40 that is in fluid communication with the effluent line 19, with the carbon monoxide sensor 40 being adapted to sense a residual carbon monoxide content of the impurity-depleted hydrogen stream 18. The carbon monoxide sensor 40 may be different from the methane sensor 32, although it is to be appreciated that the same type of sensors may be employed for the carbon monoxide sensor 40 and the methane sensor 32.

In an embodiment and as shown in FIG. 1, the PSA apparatus 10 further includes a control unit 34 that is adapted to receive a measurement of the residual methane content from the methane sensor 32. The control unit 34 may be a process computer or programmable controller that is operated by suitable software that includes a control algorithm. In accordance with an exemplary method, a measurement of the sensed residual methane content that is obtained by the methane sensor 32 is communicated to the control unit 34. The control unit 34 may be programmed with a correlation between measurements of sensed residual methane content and corresponding residual carbon monoxide content for the impurity-depleted hydrogen stream 18, which correlation may be readily established through predetermination of carbon monoxide content and methane content of impurity-depleted hydrogen streams that are withdrawn from a particular adsorption unit 12 at various stages of the PSA process. Alternatively, in another embodiment, the sensed residual methane content of the impurity-depleted hydrogen stream 18 is correlated to a carbon monoxide content of the impurity-depleted hydrogen stream 18 in the control unit 34 using, e.g., measurements from the methane sensor 32 and the carbon monoxide sensor 40, to produce a correlated relationship between the sensed residual methane content and the sensed carbon monoxide content. The correlated relationship may be adjusted as measurements are received by the control unit 34 throughout the PSA process. Because breakthrough of methane through the adsorption unit 12 occurs quicker than breakthrough of carbon monoxide, the measurements of the residual methane content enable maximized control of residual impurity content, including control of residual carbon monoxide content, in the impurity-depleted hydrogen stream 18 as compared to process control that relies upon sensing the residual carbon monoxide content alone.

In an embodiment, a process variable for the PSA process is adjusted, as needed, based on the measurement of the sensed residual methane content using, e.g., the control unit 34. For example, the process variable may be adjusted based upon the measurement of the sensed residual methane content alone, or may be adjusted based on the correlated relationship between the sensed residual methane content of the impurity-depleted hydrogen stream 18 and the carbon monoxide content of the impurity-depleted hydrogen stream 18. The adjustment to the PSA process may be any action that is effective to vary the residual methane content, and by extension the residual carbon monoxide content, in the impurity-depleted hydrogen stream 18 in the direction necessary to obtain desired product purity. Among representative adjustments which may be made are the following: (1) adjusting the adsorption step time or other variable to control the impurity loading of the adsorbent bed 14; (2) adjusting a cocurrent depressurization termination pressure to control the impurity breakthrough at the outlet end 20 of the adsorbent bed 14; and/or (3) for multi-bed adsorption units 212 as shown in FIG. 2, adjusting the amount of purge stream 242 received by each adsorbent bed 214. 215, 217, 219 to control the extent of regeneration. Other actions may also be effectively employed.

A flow control mechanism 36 may be operated by the control unit 34 to implement the adjustment to the PSA process as determined by the control unit 34. For example, the flow control mechanism 36 may be a feed valve 36 that may be timed by the control unit 34 to close earlier or later during a subsequent adsorption stage, depending upon an adjustment to be implemented.

A target residual methane content or a target residual carbon monoxide content for the impurity-depleted hydrogen stream 18 may vary depending upon a stage in the PSA process during which the impurity-depleted hydrogen stream 18 is produced, as well as based on requirements for downstream processes that use the impurity-depleted hydrogen stream 18 that is produced by the PSA apparatus 10. For example, the impurity-depleted hydrogen stream 18 provided during cocurrent depressurization generally has a greater concentration of impurities than a desired product impurity level. A typical ratio of residual carbon monoxide or methane content in the impurity-depleted hydrogen stream 18 produced during cocurrent depressurization to residual carbon monoxide or methane content in the product stream is approximately 10:1 for PSA processes that produce the product stream having 99+ mol % hydrogen. However, this ratio will vary depending on the type of cycle, feed conditions, product purity, and the like, and is extremely difficult to predict under certain conditions, such as varying feed composition. Therefore, after the target methane content in the impurity-depleted hydrogen stream 18 produced during cocurrent depressurization gas is reached within a defined tolerance, the residual carbon monoxide content of the impurity-depleted hydrogen stream 18 that is provided as the product stream may be measured. In an embodiment, the target residual carbon monoxide content of the product stream is less than or equal to about 10 parts per million (ppm) by volume. If the residual carbon monoxide content of the impurity-depleted hydrogen stream 18 that is provided as the product stream is not at the desired value, the difference between the actual and desired values is used to calculate a new target value for the residual methane content in the impurity-depleted hydrogen stream 18 produced during cocurrent depressurization. In an embodiment, the process variable is adjusted in response to the control unit 34 determining that the carbon monoxide content of the impurity-depleted hydrogen stream 18 that is provided as the product stream exceeds 10 ppm by volume.

Another embodiment of a method of preparing an impurity-depleted hydrogen stream 18 will now be described using another exemplary PSA apparatus 210 as shown in FIG. 2. Referring to FIG. 2, the PSA apparatus 210 includes a multi-bed adsorption unit 212 that includes at least a first adsorption bed 214 and a second adsorption bed 215, although it is to be appreciated that additional adsorption beds 217, 219 may be present (with the multi-bed adsorption unit 212 of FIG. 2 shown having four adsorption beds 214, 215, 217, 219). The first adsorption bed 214 and the second adsorption bed 215 are both adapted to receive the hydrogen-containing feed stream 13, and the general principles by which the first adsorption bed 214 and the second adsorption bed 215 operate, in this embodiment, are the same as described above for the PSA apparatus 10 that includes the single adsorption bed 14. However, in this embodiment, the effluent line 219 for each adsorption bed 214, 215, 217, 219 is split to enable a purge stream 242 from one of the adsorption beds 214 to be provided to another adsorption bed 215 during the PSA process, as described in further detail below.

In this embodiment, impurities such as the methane and the carbon monoxide from the hydrogen-containing feed stream 13 are adsorbed in each adsorption bed 214, 215, 217, 219, with operation of the adsorption beds 214, 215, 217, 219 coordinated to enable purging and regeneration with streams from other adsorption beds 214, 215, 217, 219. For example, adsorption in the first adsorption bed 214 may be terminated and the first adsorption bed 214 may be cocurrently depressurized. At least a portion of the impurity-depleted hydrogen stream 18 that is produced during cocurrent depressurizing of the first adsorption bed 214 may be provided as a purge stream 242 to the second adsorption bed 215 for regenerating the second adsorption bed 215. A portion of the impurity-depleted hydrogen stream 18 is provided as a product stream 244, such as portions of the impurity-depleted hydrogen stream 18 that are produced during steady state operation of the first adsorption bed 214 and, optionally, during cocurrent depressurizing.

The impurity-depleted hydrogen stream 18 that is provided by the second adsorption bed 215 and any additional adsorption beds 217, 219 may be distributed similar to the impurity-depleted hydrogen stream 18 from the first adsorption bed 214 to enable purging and regeneration of the other adsorption beds. In this embodiment and referring to FIG. 2, the effluent lines 219 from each adsorption bed 214, 215, 217, 219 are split to enable the purge stream 242 and the product stream 244 to be separated. In particular, an effluent line 219 for the first adsorbent bed 214 may be split into a product line 241 and a purge line 243, with the first purge line 243 in fluid communication with the second adsorption bed 215 for regenerating the second adsorption bed 215 with the impurity-depleted hydrogen stream 18 from the first adsorption bed 214. Likewise, a second effluent line 219 that is in fluid communication with the second adsorption bed 215 is split into a second product line 247 and a second purge line 245. The second purge line 245 may be in fluid communication with the first purge line 243, and may facilitate bi-directional flow of the purge stream 242 from the first adsorption bed 214 into the second adsorption bed 215 as well as facilitation of flow in the reverse direction to provide the purge stream 242 to the second adsorption bed 215. Effluent lines 219 for other adsorption units 217, 219 may be similarly configured, as shown in FIG. 2. A series of valves 250 may be employed to control flow between the various adsorption beds 214, 215, 217, 219.

Referring to FIG. 2, a product manifold 248 is in fluid communication with the first product line 241, the second product line 247, and also with any additional product lines, for combining the product stream 244 from the first product line 241, the second product line 247, and any additional product lines together.

Similar to the embodiment of the method described above in the PSA apparatus 10 of FIG. 1, the method of this embodiment includes sensing the residual methane content of the impurity-depleted hydrogen stream 18, as well as optionally sensing the residual carbon monoxide content of the impurity-depleted hydrogen stream 18. However, due to the splitting of the first effluent line 219, various locations for placing the methane sensor 32 and the optional carbon monoxide sensor 40 exist. For example, in an embodiment, the residual methane content of the purge stream 242 is sensed and the residual carbon monoxide content of the product stream 244 is sensed. As such, the methane sensor 32 may be in fluid communication with the first purge line 243 and the second purge line 245, and the carbon monoxide sensor 40 may be in fluid communication with the product manifold 248. Measurements from the methane sensor 32 and the carbon monoxide sensor 40 may be communicated to the control unit 34 and used to control the PSA process in the same manner as described above. Furthermore, due to the physical separation of the product manifold 248 and the purge line 243, the correlated relationship between the sensed residual methane content of the purge stream 242 and the carbon monoxide content of the product stream 244 may be recalibrated at steady state operation of the PSA process, thereby enhancing accuracy of the process controls.

EXAMPLE

Figure 3:
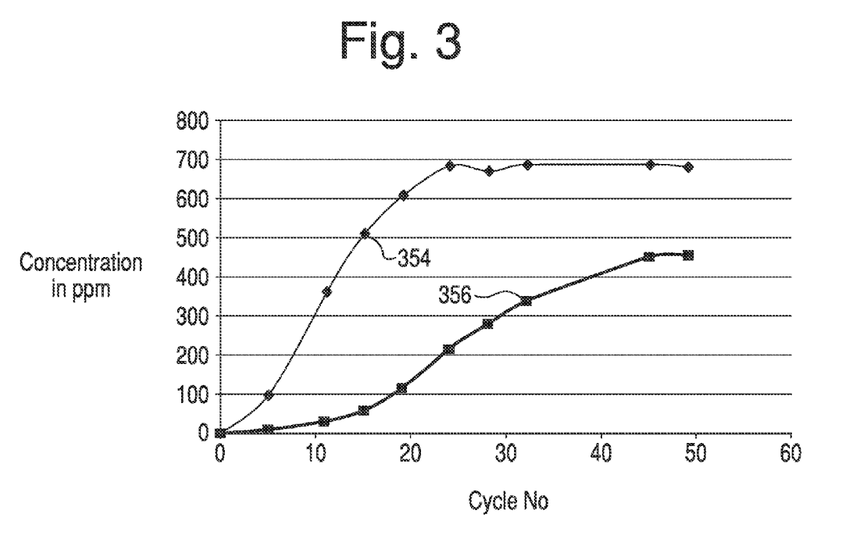
FIG. 3 is a graph showing a measurement of residual methane content and residual carbon monoxide content in an impurity-depleted hydrogen stream during concurrent depressurization after adsorption in the adsorption unit of FIG. 1 over various cycles of the pressure swing adsorption apparatus.

A PSA process was conducted employing an adsorption unit 12 including a single adsorption bed 14, such as the PSA apparatus 10 shown in FIG. 1. For the PSA process, a hydrogen-containing feed stream 13 having the following composition was provided: 72.5 mol % hydrogen, 0.6 mol % nitrogen, 3.5 mol % carbon monoxide, 4.9 mol % methane, and 18.5 mol % carbon dioxide. The adsorption bed 14 was loaded with fresh activated carbon in the bottom two thirds of the adsorption bed 14, and a zeolitic molecular sieve was loaded in the top one third of the adsorption bed 14. The hydrogen-containing feed stream 13 was introduced into the adsorption bed 14 at a first elevated pressure of about 2482 kPa, with a regeneration pressure of about 158 kPa employed. A feed rate of the hydrogen-containing feed stream 13 into the adsorption bed 14 was set such that carbon monoxide was removed to 10 ppm by volume in the impurity-depleted hydrogen stream 18 during steady state operation and before cocurrent depressurizing. The adsorption bed 14 was continuously cycled through the adsorption, depressurization, regeneration, and pressurization steps. Samples of the impurity-depleted hydrogen stream 18 were taken at the end of the cocurrent depressurization step every four cycles and analyzed through gas chromatography using a flame ionization detector as both the methane sensor 32 and the carbon monoxide sensor 40 to obtain a measurement of residual methane and residual carbon monoxide in the impurity-depleted hydrogen stream 18. The data shown in the graph of FIG. 3 was obtained, with residual methane content 354 and residual carbon monoxide content 356 shown at various cycles of the PSA process. As the data shows, methane breakthrough responds quickly as compared to carbon monoxide breakthrough, and the residual methane content 354 can be correlated to the residual carbon monoxide content 356. Once the correlation is established, process variables for the PSA process can be adjusted based upon sensed residual methane content 354 in the impurity-depleted hydrogen stream 18. For this particular example, it was found that approximately 700 ppm by volume of residual methane content 354 sensed at the end of cocurrent depressurization correlates to a concentration of 10 ppm by volume of carbon monoxide in the product stream (i.e., during steady state operation of the adsorption unit 12), although the correlation shown in FIG. 3 shows higher residual carbon monoxide content measurements 356 due to the point in the PSA process at which the impurities were sensed. In particular, the residual carbon monoxide measurements 354 shown in FIG. 3 were taken during cocurrent depressurization, not in the product stream.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of analyzing content of an impurity-depleted hydrogen stream from a pressure swing adsorption process, the method comprising the steps of:
providing a hydrogen-containing feed stream to a pressure swing adsorption zone, wherein the hydrogen-containing feed stream further comprises an impurity content comprising methane and carbon monoxide;
adsorbing methane and carbon monoxide from the hydrogen-containing feed stream in the pressure swing adsorption zone;
withdrawing the impurity-depleted hydrogen stream from the pressure swing adsorption zone, wherein the impurity-depleted hydrogen stream has a residual methane content and a residual carbon monoxide content;
wherein withdrawing the impurity-depleted hydrogen stream comprises terminating flow of the hydrogen-containing feed stream to the pressure swing adsorption zone and cocurrently depressurizing the pressure swing adsorption zone;
sensing the residual methane content of the impurity-depleted hydrogen stream;
wherein the pressure swing adsorption zone comprises a multi-bed adsorption unit comprising a first adsorption bed and a second adsorption bed, and wherein the impurity-depleted hydrogen stream produced during cocurrent depressurizing of the first adsorption bed is provided as a purge stream to the second adsorption bed for regenerating the second adsorption bed;
wherein sensing the residual methane content comprises sensing the residual methane content of the purge stream and further comprising providing a product stream from the multi-bed adsorption unit and sensing the residual carbon monoxide content of the product stream.

2. The method of claim 1, further comprising correlating a sensed residual methane content of the purge stream to a carbon monoxide content of the product stream in a control unit to produce a correlated relationship therebetween.

3. The method of claim 2, further comprising recalibrating the correlated relationship between the sensed residual methane content of the purge stream and the carbon monoxide content of the product stream at steady state operation of the pressure swing adsorption process.

4. A method of analyzing content of an impurity-depleted hydrogen stream from a pressure swing adsorption process, the method comprising the steps of:
providing a hydrogen-containing feed stream to a pressure swing adsorption zone, wherein the hydrogen-containing feed stream further comprises an impurity content comprising methane and carbon monoxide;
adsorbing methane and carbon monoxide from the hydrogen-containing feed stream in the pressure swing adsorption zone;
withdrawing the impurity-depleted hydrogen stream from the pressure swing adsorption zone, wherein the impurity-depleted hydrogen stream has a residual methane content and a residual carbon monoxide content; and
sensing the residual methane content of the impurity-depleted hydrogen stream;
further comprising sensing the residual carbon monoxide content of the impurity-depleted hydrogen stream and further comprising correlating a sensed residual methane content of the impurity-depleted hydrogen stream to a carbon monoxide content of the impurity-depleted hydrogen stream in a control unit to produce a correlated relationship therebetween.

5. The method of claim 4, further comprising adjusting a process variable for the pressure swing adsorption process using the control unit based on the correlated relationship between the sensed residual methane content of the impurity-depleted hydrogen stream and the carbon monoxide content of the impurity-depleted hydrogen stream.

6. The method of claim 5, wherein adjusting the process variable comprises adjusting the process variable in response to the control unit determining that the carbon monoxide content of the impurity-depleted hydrogen stream exceeds 10 parts per million by volume.

7. A method of preparing an impurity-depleted hydrogen stream, the method comprising the steps of:
generating a hydrogen-containing feed stream comprising an impurity content comprising methane and carbon monoxide;
providing the hydrogen-containing feed stream to a pressure swing adsorption zone comprising a multi-bed adsorption unit, wherein the multi-bed adsorption unit comprises a first adsorption bed and a second adsorption bed;
adsorbing methane and carbon monoxide from the hydrogen-containing feed stream in the first adsorption bed to produce the impurity-depleted hydrogen stream, wherein the impurity-depleted hydrogen stream has a residual methane content and a residual carbon monoxide content;
withdrawing a portion of the impurity-depleted hydrogen stream from the first adsorption bed as a purge stream to the second adsorption bed for regenerating the second adsorption bed;
withdrawing a portion of the impurity-depleted hydrogen stream from the first adsorption bed as a product stream;
sensing the residual methane content of the purge stream;
sensing the residual carbon monoxide content of the product stream; and
communicating a measurement of the sensed residual methane content and a measurement of the sensed residual carbon monoxide content to a control unit.

* * * * *